US011661287B2

(12) United States Patent
Burgart et al.

(10) Patent No.: US 11,661,287 B2
(45) Date of Patent: May 30, 2023

(54) HOPPER

(71) Applicant: Kleemann GmbH, Göppingen (DE)

(72) Inventors: Elena Burgart, Nürtingen (DE); Christian Knoblich, Stuttgart (DE); Reiner Köpf, Gingen an der Fils (DE)

(73) Assignee: Kleemann GmbH

( * ) Notice: Subject to any disclaimer, the term of this patent is extended or adjusted under 35 U.S.C. 154(b) by 796 days.

(21) Appl. No.: 16/090,627

(22) PCT Filed: Mar. 16, 2017

(86) PCT No.: PCT/EP2017/056196
§ 371 (c)(1),
(2) Date: Oct. 2, 2018

(87) PCT Pub. No.: WO2017/174315
PCT Pub. Date: Oct. 12, 2017

(65) Prior Publication Data
US 2019/0119046 A1    Apr. 25, 2019

(30) Foreign Application Priority Data
Apr. 7, 2016   (DE) .......................... 102016106349.5

(51) Int. Cl.
*B65G 21/20*      (2006.01)
*B02C 21/02*      (2006.01)
*B02C 23/02*      (2006.01)

(52) U.S. Cl.
CPC .......... *B65G 21/2081* (2013.01); *B02C 21/02* (2013.01); *B02C 23/02* (2013.01)

(58) Field of Classification Search
CPC .......... B65G 21/02; B02C 21/02; B02C 23/02
(Continued)

(56) References Cited

U.S. PATENT DOCUMENTS

2008/0041984 A1 *   2/2008   Sauser ................... B65G 47/19
                                                              241/75

FOREIGN PATENT DOCUMENTS

EP      2664492 A2 *   11/2013   ............. B02C 21/02
EP      2664492 A2     11/2013
(Continued)

OTHER PUBLICATIONS

China Office Action for corresponding 201780021910.X dated Nov. 27, 2019, 6 pages (not prior art).
(Continued)

*Primary Examiner* — Michael McCullough
*Assistant Examiner* — Molly K Devine
(74) *Attorney, Agent, or Firm* — Lucian Wayne Beavers; Patterson Intellectual Property Law, PC (57) ABSTRACT

The invention relates to a hopper, in particular for a rock-crushing plant, a screening plant or the like having a side wall that bounds the hopper space, a wall broadening portion being pivotably coupled to the side wall, an auxiliary means for positioning in an upright state being assigned to the wall broadening portion in order to move the wall broadening portion from a folded-down transport position to an upright working position, and wherein the auxiliary means for positioning in an upright state has an actuator that is coupled to a pivotably mounted lever. In the context of such a hopper, in order to be able to easily move the wall broadening portion in a controlled and reliably manner between the transport position and the working position, it is provided according to the invention that the lever is pivotably coupled to an equalizing lever, and that the equalizing lever is pivotably coupled to the wall broadening portion.

14 Claims, 5 Drawing Sheets

(58) Field of Classification Search
USPC .................................................. 209/243, 244
See application file for complete search history.

(56) References Cited

FOREIGN PATENT DOCUMENTS

EP          2730459 A2    5/2014
WO       2013068589 A1   5/2013

OTHER PUBLICATIONS

Canada office action for corresponding patent application No. 3,019,691 dated May 5, 2020, 4 pages (not prior art).
Australian Office Action for corresponding patent application No. 2017245507, dated Aug. 23, 2019, 4 pages (not prior art).
International Search Report in corresponding PCT/EP2017/056196 (Not Prior Art).

* cited by examiner

HOPPER

The invention relates to a hopper, in particular for a rock crushing plant, screening plant or the like, having a side wall which bounds the hopper chamber, wherein a wall extension is pivotably coupled to the side wall, wherein an erection aid is assigned to the wall extension in order to move the wall extension between a downfolded transport position into an erected working position, and wherein the erection aid has an actuator, which is coupled to a pivotably mounted lever.

From EP 2 730 459 A2, a rock crushing plant having a hopper is known. Such hoppers are used in crushing plants, for instance rotary impact crushers, jaw crushers, cone crushers, or, indeed, in screening plants. In the region of the bottom side of the hopper chamber, a transporting device, for instance a conveyor trough or a conveyor belt, is assigned to the hopper. Via the hopper, the material to be crushed can be poured in and delivered to the transporting apparatus. Usually, the hoppers are loaded by means of excavators, wheel loaders or crushing or screening plants. The overall height of the rock crushing plant must be dimensioned such that they are transportable with low-loaders. By means of the fold-down wall extensions, the overall height of the machine is able to be reduced. The erection aid is used for the purpose of work simplification in order that the machine conversion is easy to accomplish. In the erection aid according to EP 2 730 459 A1, the hopper chamber is bounded by two side walls, to which, via a first pivot bearing, a wall extension is hinged. The erection aid has as the actuator a hydraulic cylinder, which is pivotably coupled to the side wall. In addition, a stay is used, which is likewise pivotably connected to the side wall. The stay, for its part, is pivotably connected to a lever via a second pivot bearing. The lever is pivotably coupled to the wall extension. In the region between the coupling points of the lever to the wall extension or the stay, the actuator acts with its piston rod. In this mechanism, the articulation axes of the first and of the second pivot bearing, in the downfolded position of the wall extension, are aligned. This layout of the joints is maintained until such time as the wall extension reaches its erected position. In order to secure the erected position, the hydraulic cylinder must be further telescoped, so that the articulation axis of the second pivot bearing shifts in relation to the articulation axis of the first pivot bearing. This mechanism has the drawback that, due to production tolerances, it is only with great effort possible to arrange the two articulation axes of the first and of the second pivot bearing in mutual alignment. Compensation mechanisms must therefore be provided in the gear assembly in order to ensure functionality. For instance, in the region of the hinge points, long holes or the like must be provided. Such long holes or other compensating mechanisms have the drawback, however, that they lead to an unstable sequence of motions. In the arrangement known from EP 2 730 459 A2, the gear assembly overruns a dead center position, in which the wall extension, due to the compensating mechanisms, performs an uncontrolled motion at least in a section of the pivot motion. In addition, the known arrangement requires a large number of parts and high assembly complexity.

The object of the invention is to provide a hopper of the type stated in the introduction, with which the wall extension is able to be easily moved in a controlled and reliable manner between the transport position and the working position.

This object is achieved by virtue of the fact that the lever is pivotably coupled to a compensating lever, and that the compensating lever is pivotably coupled to the wall extension.

According to the invention, with the incorporation of the side wall and the wall extension, a stably working link system is hence created, wherein the actuator, the lever and the compensating lever form a link chain. With this arrangement, the wall extension can be reliably shifted between a transport position and the working position. This link chain is also able to be installed in a problem-free manner without the need for complex adaptation work.

According to a preferred design variant of the invention, it can be provided that the actuator and the lever are pivotably connected to the wall element, and that the actuator is coupled to one arm of the lever and the compensating lever is connected to the second arm of the lever. In this way, a type of hinged joint is created, wherein, via the dimensioning of the lever arms, the necessary actuating forces can be easily configured with regard to the adjustment travel of the actuator.

A hopper according to the invention can be such that the hinge points of the compensating lever form a first half-line and the hinge points of the lever a second half-line, and that the half-lines, in the working position, enclose an angle ranging between 180° and 150°. In the case of an angle of 180° (extended position), the weight force of the wall extension is fully transferred into the hinge points and the actuator is kept force-free. Such a system hence automatically protects itself. Due to production tolerances, it is now only with difficulty possible to adhere to the exact angular position of 180°. The inventors have recognized that, in customary applications of rock crushing plants or screening plants, an angular position ranging between 180° and 150° is sufficient to enable, with the use of standard actuators, a low-force stabilization of the wall extension. In particular where hydraulic cylinders are used as the actuators, an angular position ranging between 180° and 170° has proved successful.

The inventors have further recognized that an angular position ranging between 180° and 210° (hyperextended position) also offers particular advantages. Such a system protects itself automatically, wherein the erection of the wall extension is constantly guaranteed. In the case of angular positions above 210°, such self-protection is also ensured, though then the wall extension again folds down markedly downward in relation to the side wall. Particularly advantageous in the use of hydraulic cylinders are, in this case, angular positions ranging between 180° and 190°.

One conceivable variant of the invention is such that the compensating lever or the lever, in the working position, bears against a stop of the wall extension or of the wall element. A reproducible erect position of the wall extension can thereby be guaranteed in a simple manner. To the stop can also be assigned, for instance, a switching element, which switches off the actuator as soon as contact is made with the stop.

If it is provided that two holders are arranged at a distance apart on the side wall, then the actuator can be arranged secured between the two holders and pivotably mounted on these. This has advantages, in particular, in rough conditions associated with construction site operation. The holders protect the sensitive actuator from mechanical contact. The two-sided mounting of the actuator keeps it free from torques in the region of its pivot bearing.

In addition, it is conceivable that two fastening portions are arranged at a distance apart on the wall extension, and that the compensating lever is arranged between the two fastening portions and pivotably mounted on these. The compensating lever is then also accommodated in protected arrangement and mounted in torque-free arrangement.

The fastening portions or the holders can also be configured as stiffening ribs and connected, for instance welded, to the outer side of the side wall or the wall extension. In this way, a material-optimized design for the side wall or the wall extension is able to be accomplished.

A particularly preferred variant of the invention is such that an erectable wall element is hinged to a rear wall bounding the hopper chamber, wherein the wall element, in the erected state, has a lesser height than the erected wall extensions. In the region of the rear wall is then offered a filling entrance which is easily accessible for a wheel loader.

The invention is explained in greater detail below on the basis of the illustrative embodiments represented in the drawings, in which.

Figure 1:
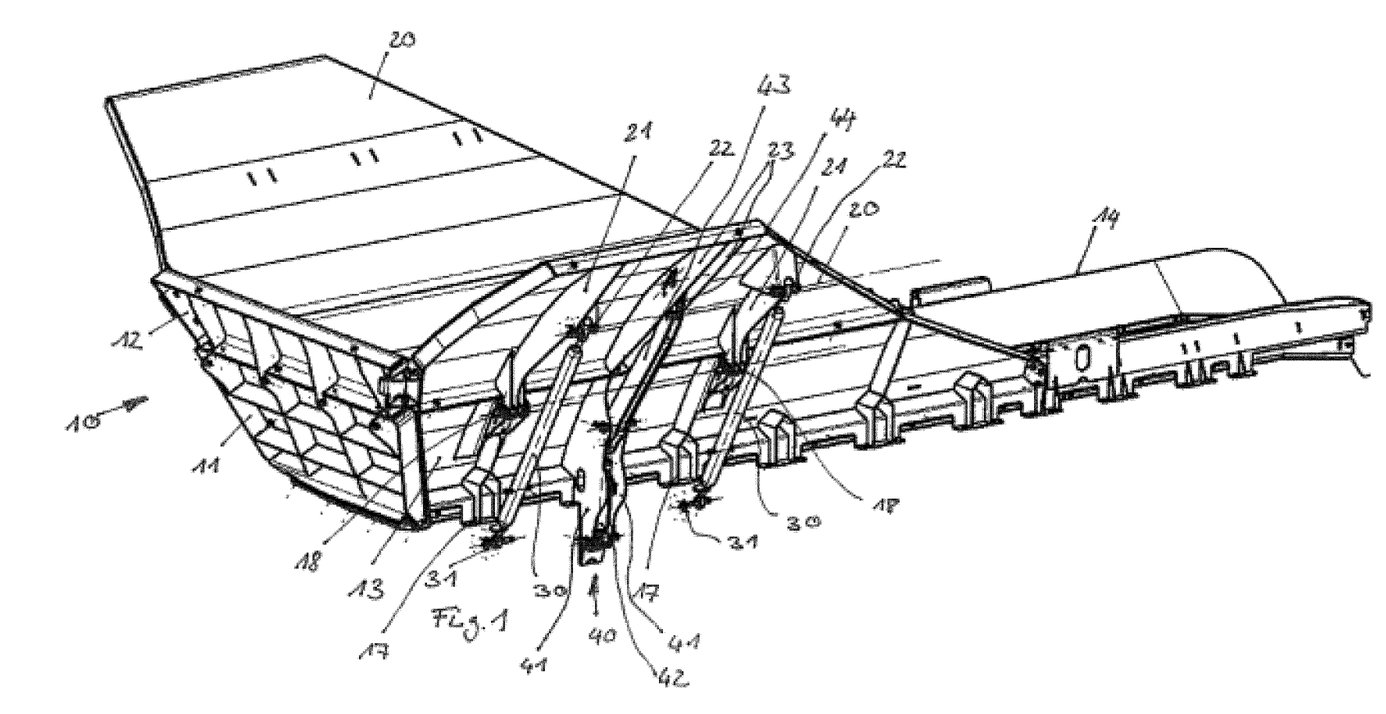
FIG. 1: shows a hopper in perspective side view.
Figures 2, 3:
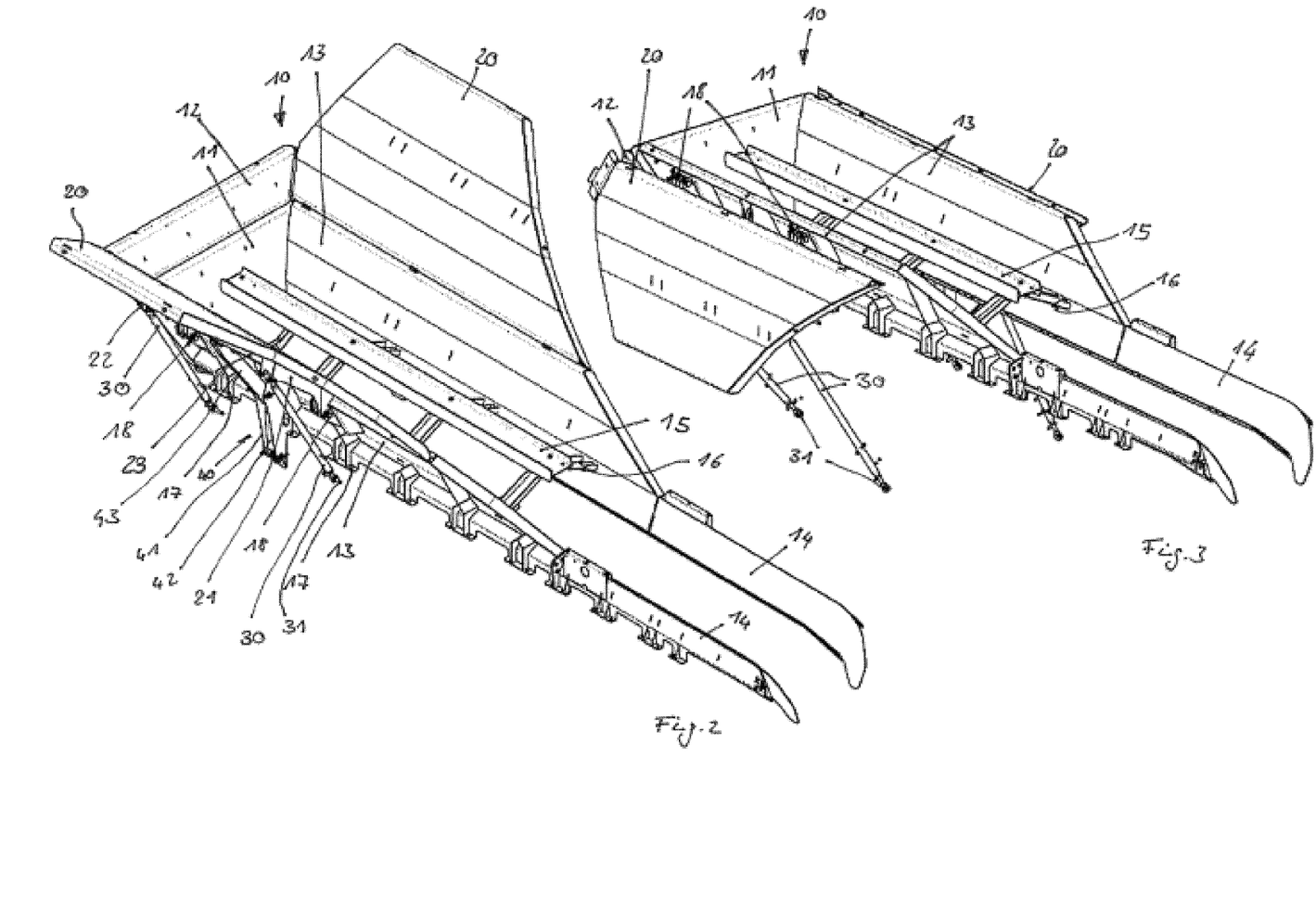
FIG. 2: shows the hopper according to FIG. 1 in lateral view from the front.
FIG. 3: shows the hopper according to FIGS. 1 and 2 in an altered operating position.

In FIGS. 1-3, a hopper 10 for a rock crushing plant or a screening plant is represented. The hopper 10 has a hopper chamber, which on the rear side is bounded by a rear wall 11. Hinged to the rear wall 11 is a wall element 12. The hinge axis is placed such that the wall element 12 can be folded down downward, as is shown by FIG. 3. Connected laterally to the rear wall 11 are side walls 13. The side walls 13 and the rear wall 11 are positioned relative to each other such that the upwardly widening hopper chamber is obtained. Opposite the rear wall 11, an attachment 14 is respectively connected to the side walls 13. As can be seen from FIG. 2, in the bottom region of the hopper chamber is provided a relief element 15, which is laterally braced toward the side walls 13 by means of profile sections 16. Under the relief element 15 runs an endlessly circulating conveyor belt (not represented). This conveyor belt is reversed in the region of the rear wall 11. The conveyor belt extends out of the hopper chamber and underneath the attachments 14.

As can be seen from FIG. 1, hinged to the side walls 13 are wall extensions 20. The wall extensions 20 can here be formed, as wall elements, from a sheet metal blank. On the outer side of the wall extension 20 are fastened support elements 21, which in the present case are configured as supporting ribs. The support elements 21 can be welded in place on the outer side of the wall extension 20. In order to simplify the structural complexity, the support elements 21 at the same time have bearing points for the formation of bearings 18. By means of the bearings 18, the wall extensions 20 are coupled to the side walls 13. For this purpose, the side wall 13 has on a bearing pedestal a further hinge part, which completes the bearing 18. To the support element 21 is additionally fastened a securing element 30. The securing element 30 can be realized, as in the present case, as a supporting strut. For the connection of the securing element 30, the support element 21 has a coupling point 22. At the end facing away from the coupling point 22, the securing element 30 has a coupling end 31. This coupling end 31 can be positioned into a fastening point, which is arranged, for instance, on the side wall 13. The function of the securing element 30 is explained later.

Figure 4:
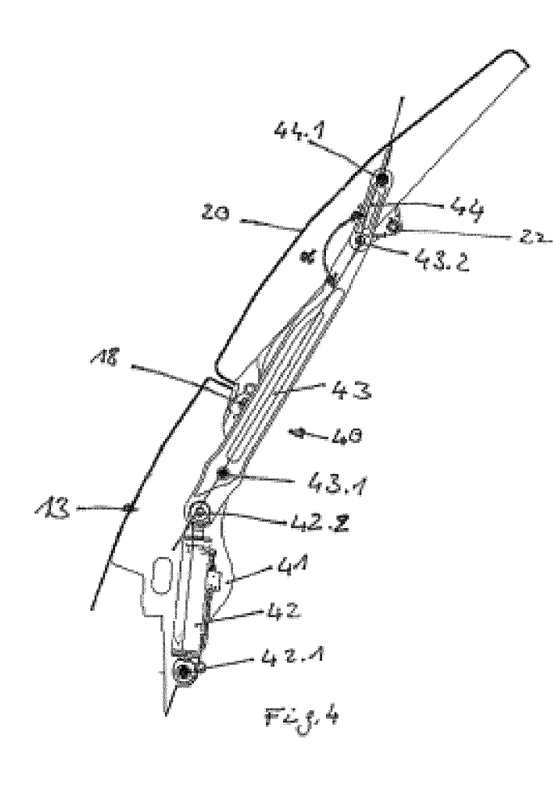
FIGS. 4-7: show a series of figures in which a sequence of motions of a part of the hopper according to FIGS. 1-3 is represented.
Figure 5:
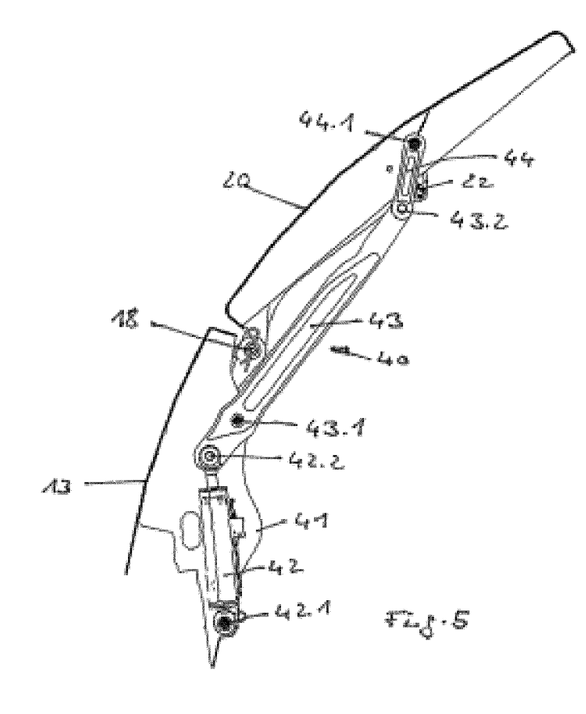
Figure 6:
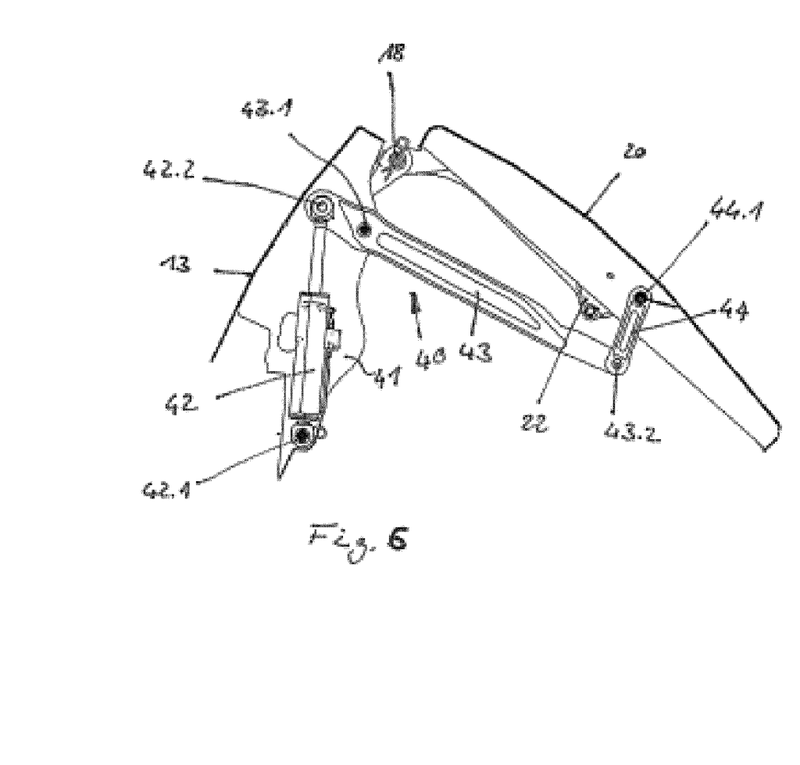

On the outer side of the hopper 10, erection aids 40 are additionally mounted in the region of the side walls 13. The erection aids 40 comprise a holder, preferably two holders 41, which are fixed, for instance welded, to the outer side of the side wall 13. The holders 41 are here arranged at a distance apart. Between the holders 41, an actuator 42 is accommodated in protected arrangement. As in the present case, the actuator 42 can be realized as a hydraulic cylinder. A different design of an activator 42, for instance some other linear drive or a motorized rotary drive, is also, however, conceivable. In FIGS. 4-7, the structure of the erection aid 40 is more clearly apparent, for which reason reference is made below to these figures. As FIG. 4 shows, the actuator 42 is on one side pivotably coupled to the two holders 41. For this purpose, the holders 41 have mutually aligned bearing points, which cooperate with a hinge point 42.1 of the actuator 42 to form a pivot bearing. That end of the actuator which is facing away from the hinge point 42.1 is coupled via a pivot bearing to a lever 43. The hinge point 42.2, which may be referred to as a first pivotal connection 42.2, is hereupon formed. The lever 43, for its part, is pivotably coupled, via the hinge point 43.1, at least to one, preferably to both holders 41 simultaneously. The free end of the lever 43 is coupled to a compensating lever 44 via a hinge point 43.2, which may be referred to as second pivotal connection 43.2, in the region of a pivot bearing. The lever 43 can be described as including a first arm extending in a first direction from the hinge point 42.1 to the first pivotal connection 42.2 and a second arm extending in a second direction opposite to the first direction from the hinge point 42.1 to the second pivotal connection 43.2, such that extension of the actuator 42 lowers the wall extension 20 and retraction of the actuator 42 raises the wall extension 20. As can be further seen for example by the straight lines drawn in FIGS. 4 and 8, the first pivotal connection 42.2, the hinge point 43.1 and the second pivotal connection 43.2 may lie in a straight line. The compensating lever 44, for its part, forms in the region of a hinge point 44.1 a pivot bearing with the wall extension 20. As can be seen from FIG. 1, two fastening portions 23 are for this purpose fastened to the outer side of the wall extension 20. As in the present case, the fastening portions 23 can be configured as stiffening ribs and connected, preferably welded, to the outer side of the wall extension 20. In the region between the two fastening portions 23, the compensating lever 44 is accommodated in protected arrangement.

Figure 7:
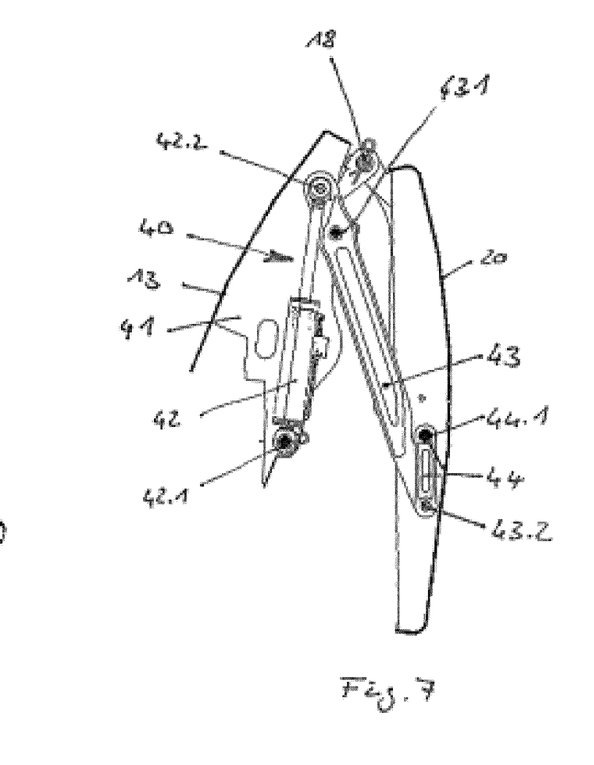

The function of the erection aid 40 is explained in greater detail below. In this context, with reference to FIGS. 4-7, the downfolding of the wall extension 20 from the working position shown in FIG. 4 into the transport position shown in FIG. 7 is firstly explained. In the working position shown in FIG. 4, the actuator 42 is in its drawn-in position. In the hydraulic cylinder used, the piston rod is hence retracted. If now the actuator 42 is actuated, then it travels continuously into its extended position. Since the hinge point 42.2 is distanced from the hinge point 43.1, the actuator 42 can introduce a torque into the lever 43. Via this torque and the countertorque induced by the weight force of the wall extension, the wall extension 20 folds down in a continuous and secured manner into the transport position. In the process thereof, the lever 43 and the compensating lever 44 pivot continuously. As the series of figures shows, the actuator 42 remains constantly secured between the two holders 41 during the sequence of motions.

In order now to move the wall extension 20 from the transport position shown in FIG. 7 into the working position shown in FIG. 4, the series of figures is run through in the reverse order. Starting from that extended position of the actuator 42 which is shown in FIG. 7, this actuator is retracted. In the hydraulic cylinder used, the piston rod travels into the cylinder. As soon as the wall extension 20 has reached the position shown in FIG. 4, the hydraulic cylinder is switched off. In order to obtain a defined position of the wall extension 20, it can be provided, for instance, that the lever 43 or the compensating lever 44 moves against a stop (not shown). In the erected position according to FIG. 4, the compensating lever 44 and the lever 43 enclose an angle α which preferably ranges between 180° and 150°, particularly preferably between 180° and 170°. In the case of an angular position of this kind, the hinge points 44.1, 43.2 and 43.1 are laid out such that, in the actuation direction of the actuator 42, only a low force is acting. Correspondingly, in the actuator 42, only a low holding force has to be provided in order to secure the position of the wall extension 20. In the case of the proposed angular measurements, this can be achieved without difficulty with current hydraulic cylinders. In order to secure the position of the wall extension 20, also the securing elements 30 can additionally be used. In the erected position of the wall extension 20, the securing elements 30 pivotably fastened to the support elements 21 are pivoted in the direction of the coupling points 17 and fixed here, for instance, with a locking pin. In the region of the side walls 13, these coupling points 17 are easily accessible for a machine operator. At this point, it should once again be pointed out that the securing elements 30 can constitute an optional measure. The erection aid 40 according to the invention is in particular suitable for guaranteeing automatic holding of the wall extension 20.

Figure 8:
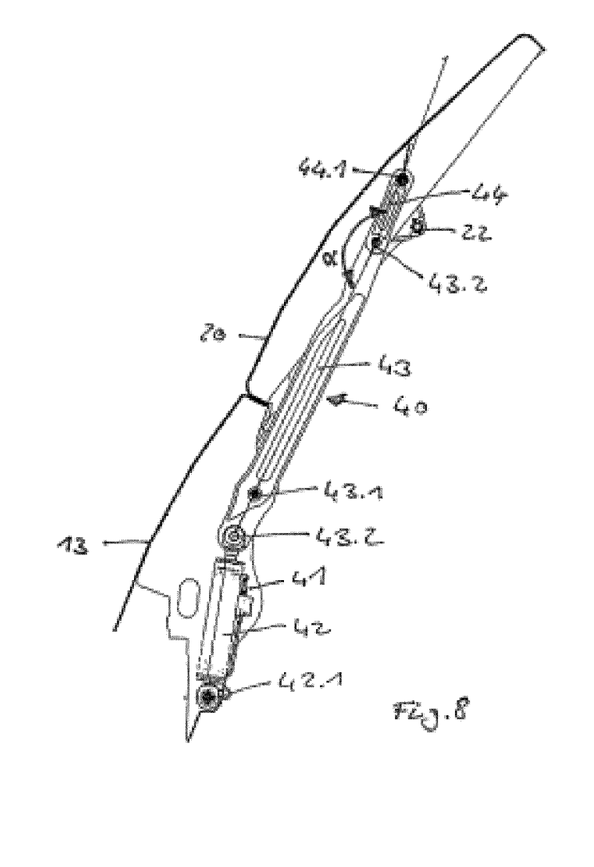
FIGS. 8-9: show two variants to the series of figures according to FIGS. 4-7.
Figure 9:
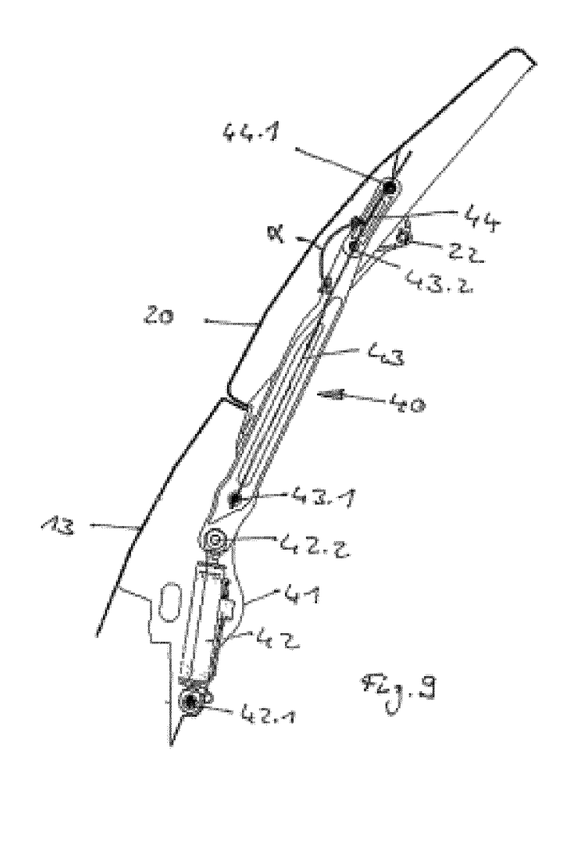

In FIGS. 8 and 9, two further variants are represented. The erection aids 40 according to these two variants here fully correspond in terms of design to the previously described embodiment. Only the arrangement of the hinge points 44.1, 43.2 and 43.1 is changed. In this respect, reference can substantially be made to the above embodiments and only the changes can be set out below. According to FIG. 8, the hinge points 44.1, 43.2 and 43.1 are arranged on a line. Accordingly, the angle α is equal to 180°.

Correspondingly to the illustrative embodiment according to FIG. 9, the angle α between the compensating lever 44 and the lever 43 can also be >180°. In the present case, the angle is chosen within the range between 180° and 210°, particularly preferably between 180° and 190°. In this respect, a hyperextended position, which holds the wall extension 20 automatically in the erected position, is obtained. Also in the illustrative embodiments according to FIGS. 8 and 9, at least one securing element 30 can be installed.

The invention claimed is:

1. A hopper, comprising:
a side wall in part bounding a hopper chamber;
a wall extension pivotably connected to the side wall;
an erection aid configured to move the wall extension between a downfolded transport position and an erected working position, the erection aid including:
  a linear actuator having a first end and a second end;
  a pivotably mounted lever, the first end of the actuator being connected to the pivotably mounted lever; and
  a compensating lever pivotably connected to the pivotably mounted lever and pivotably connected to the wall extension; and
two holders arranged at a distance apart from each other on the side wall or a part of the hopper fixed relative to the side wall;
wherein the actuator is arranged between the two holders and the second end of the actuator is pivotably mounted on the two holders;
wherein the pivotably mounted lever is pivotally mounted at a hinge point to at least one of the two holders;
wherein the pivotably mounted lever includes a first arm and a second arm fixedly connected together to pivot together about the hinge point;
wherein the actuator is connected to the first arm at a first pivotal connection and the first arm remains in a space between the two holders such that the first arm is protected from opposite sides by the two holders, as the wall extension is moved between the downfolded transport position and the erected working position;
wherein the compensating lever is connected to the second arm at a second pivotal connection; and
wherein the first arm extends in a first direction from the hinge point to the first pivotal connection and the second arm extends in a second direction opposite to the first direction from the hinge point to the second pivotal connection, such that extension of the actuator lowers the wall extension and retraction of the actuator raises the wall extension.

2. The hopper of claim 1, wherein:
the compensating lever is connected to the pivotably mounted lever and to the wall extension at pivot points forming a first half-line, and the pivotably mounted lever is connected to the actuator and to the compensating lever at pivot points forming a second half-line, and in the erected working position of the wall extension the first half-line and the second half-line enclose an angle facing toward the hopper chamber in a range of from 180° to 150°.

3. The hopper of claim 2, wherein the angle is in a range of from 180° to 170°.

4. The hopper of claim 1, wherein:
the compensating lever is connected to the pivotably mounted lever and to the wall extension at pivot points forming a first half-line, and the pivotably mounted lever is connected to the actuator and to the compensating lever at pivot points forming a second half-line, and in the erected working position of the wall extension the first half-line and the second half-line enclose an angle facing toward the hopper chamber of greater than 180°.

5. The hopper of claim 4, wherein the angle is in a range of between 180° and 210°.

6. The hopper of claim 4, wherein the angle is in a range of between 180° and 190°.

7. The hopper of claim 1, wherein:
in the erected working position of the wall extension the compensating lever or the pivotably mounted lever bears against a stop of the wall extension or of the side wall.

8. The hopper of claim 1, wherein:
the two holders are configured as stiffening ribs connected to an outer side of the side wall or the part of the hopper fixed relative to the side wall.

9. The hopper of claim 1, further comprising:
two fastening portions arranged at a distance apart from each other on the wall extension; and
wherein the compensating lever is arranged between the two fastening portions and is pivotably mounted on the two fastening portions.

10. The hopper of claim 9, wherein:
the two fastening portions are configured as stiffening ribs connected to an outer side of the wall extension.

11. The hopper of claim 1, further comprising:
a securing element including a first end connected to the wall extension and a coupling end configured to be connected to the side wall or a part of the hopper fixed relative to the side wall to form a supporting connection between the wall extension and the side wall.

12. The hopper of claim 1, further comprising:
a second side wall oppositely located from the first mentioned sidewall; and
a second wall extension connected to the second side wall.

13. The hopper of claim 1, further comprising:
a rear wall in part bounding the hopper chamber; and
a rear wall extension pivotably connected to the rear wall, the rear wall extension having a downfolded transport position and an erected working position, wherein in the erected working position the rear wall extension has a lesser height than does the wall extension of the side wall in its erected working position.

14. The hopper of claim 1, wherein:
the first pivotal connection, the hinge point and the second pivotal connection lie in a straight line.

* * * * *